United States Patent [19]

Gurney

[11] 4,297,839
[45] Nov. 3, 1981

[54] CHAIN LINK AND CHAIN ASSEMBLY INCLUDING SAME

[75] Inventor: Gerald W. Gurney, Ada, Mich.

[73] Assignee: C. L. Frost & Son, Inc., Grand Rapids, Mich.

[21] Appl. No.: 80,655

[22] Filed: Oct. 1, 1979

[51] Int. Cl.³ .............................................. F16G 13/18
[52] U.S. Cl. .................................... 59/85; 104/172 C
[58] Field of Search ............... 198/687, 685, 683, 681, 198/733, 731; 104/172 C; 59/85–89, 91

[56] References Cited

U.S. PATENT DOCUMENTS

| | | | |
|---|---|---|---|
| 1,189,036 | 6/1916 | Austin | 198/681 |
| 1,910,804 | 5/1933 | Lomando | 198/731 |
| 2,024,183 | 12/1935 | Pribil | 59/8 |
| 2,328,778 | 9/1943 | Bollinger et al. | 59/88 X |
| 2,515,079 | 7/1950 | Dalrymple | 198/189 |
| 2,579,410 | 12/1951 | Zanitis | 198/189 |
| 2,620,676 | 12/1952 | Raddings | 74/243 |
| 2,704,943 | 3/1955 | Harris | 74/246 |
| 2,793,536 | 5/1957 | Onulak | 74/250 |
| 3,093,235 | 6/1963 | Imse | 198/129 |
| 3,128,593 | 4/1964 | King | 59/35 |
| 3,144,748 | 8/1964 | Knop | 59/88 |
| 3,170,335 | 2/1965 | Kuntzmann | 74/250 |
| 3,192,785 | 7/1965 | Pearson | 74/255 |
| 3,194,612 | 7/1965 | Striepe | 308/6 |
| 3,421,313 | 1/1969 | Harada et al. | 59/78 |
| 3,590,744 | 7/1971 | Galloway et al. | 104/172 |
| 3,774,545 | 11/1973 | Karlstrom | 104/172 C |
| 3,844,221 | 10/1974 | Fromme | 59/85 X |
| 3,869,989 | 3/1975 | Pickstone | 104/94 |
| 3,905,304 | 9/1975 | Ord | 104/172 C |
| 3,913,494 | 10/1975 | Coleson et al. | 104/172 S |
| 3,916,797 | 11/1975 | Block et al. | 104/172 B |
| 4,063,413 | 12/1977 | Benton et al. | 59/35 CP |

FOREIGN PATENT DOCUMENTS 1474401 4/1966 France .

OTHER PUBLICATIONS

"12" Chain Assembly", Frost & Son, 3-11-78.

Primary Examiner—Mark Rosenbaum
Attorney, Agent, or Firm—Price, Heneveld, Huizenga & Cooper

[57] ABSTRACT

The specification discloses a chain link assembly and chain incorporating same especially adapted for enclosed track-type conveyors. The assembly includes elongated link members each with chain pivot pin or fastener receiving openings at either end and spaced, rigid bridge means at two positions intermediate the ends and pin openings for spacing and supporting the link members. Preferably the bridge members include means for supporting a chain wheel support while the link member ends include curved surfaces with openings which are elongated to allow articulation of the assembly with respect to other link members in a chain. In one form, the link members are identical, each including one bridge member having an indexing tab received in the opposite link member to align the openings and keep the link members in registry.

28 Claims, 14 Drawing Figures

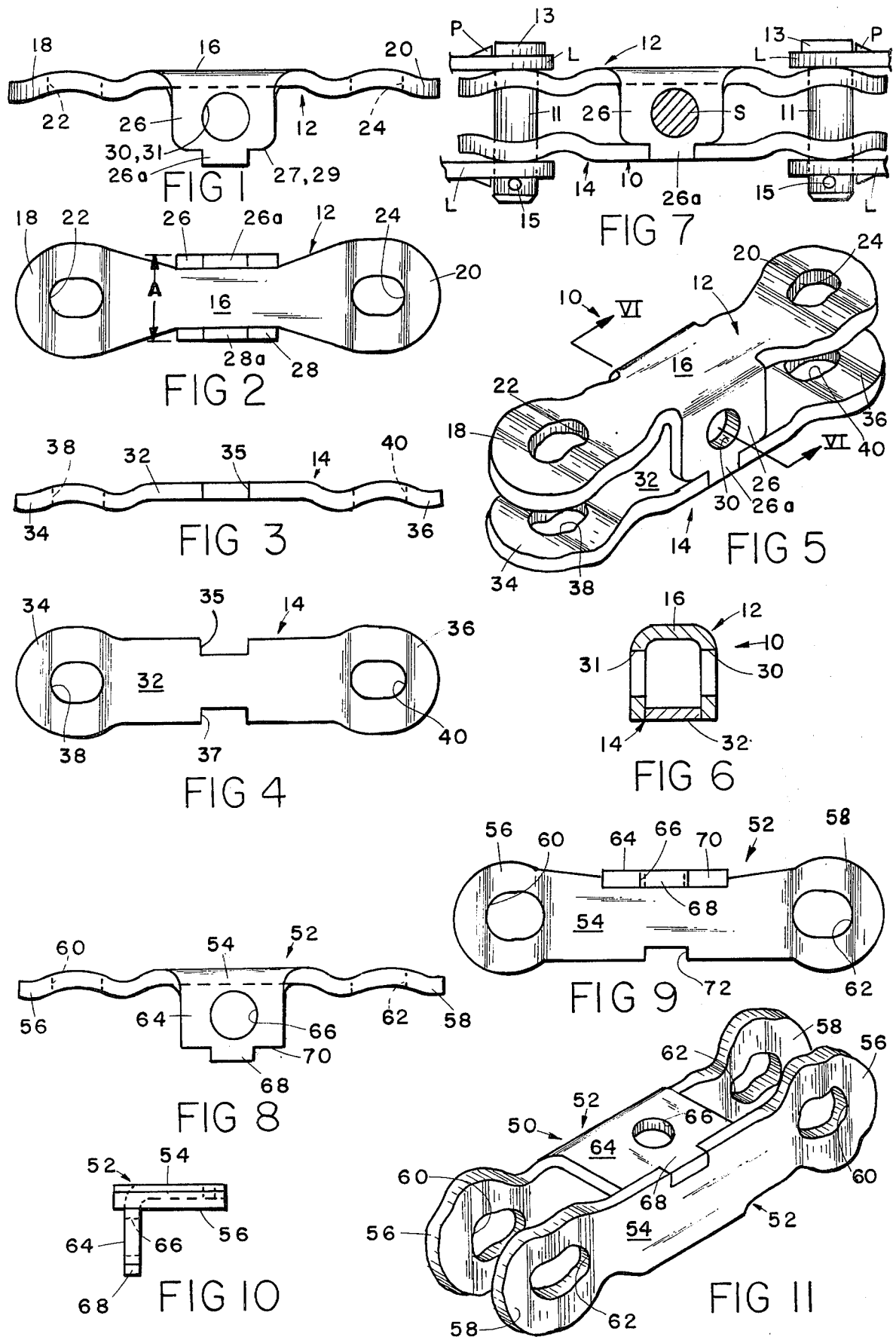

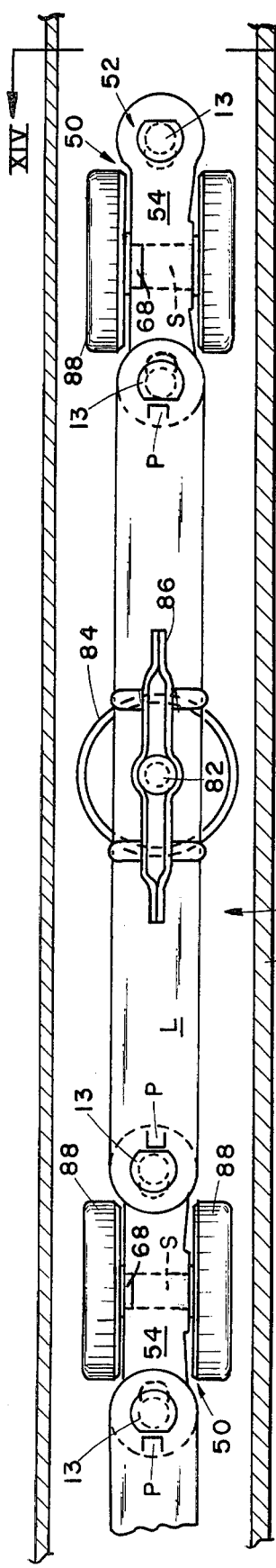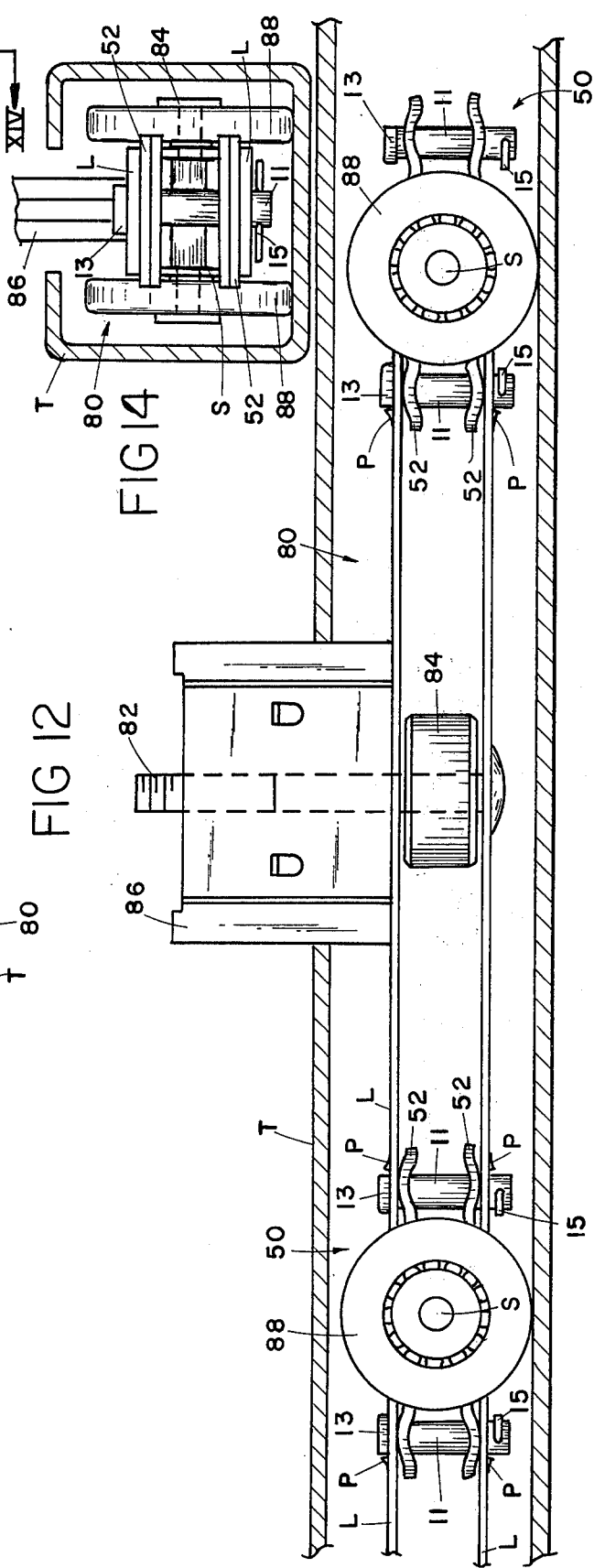

CHAIN LINK AND CHAIN ASSEMBLY INCLUDING SAME

BACKGROUND OF THE INVENTION

This invention relates to chain links and chain link assemblies for conveyor chains and, more particularly, to an improved chain link assembly especially adapted for use in enclosed track-type conveyor chains.

Conventional enclosed track-type conveyors, which may be built into the floor of a plant or facility or supported overhead, usually include numerous curves, both horizontal and vertical. Conveyor chain used in such enclosed track environments includes support wheels rotatable in two planes, both horizontal and vertical, to both provide the main support for the conveyor chain within the track and to space the chain and keep it from binding within the track as it moves around the various curves. Such chain includes various links or link assemblies and must pivot or articulate around the curves. Typically, the vertical curves have a larger radius than the horizontal curves in such conveyor systems with the minimum radius being three feet for horizontal curves and five feet for vertical curves. Such radii require articulation through approximately 20° for horizontal curves and 14° for vertical curves.

Certain prior chain used in enclosed track environments utilized long support links for supporting the objects moved by the conveyor. Shorter connecting links provided the articulation between the longer links. The shorter connecting links supported the main chain support wheels while the longer links included the spacing wheels to prevent binding. One such prior chain included shorter connecting links formed from sintered, powdered metal and pivotally joined to one another. Although relatively strong in compression, the powdered metal links were found to be relatively weak in tension which is the most significant force applied to enclosed track-type conveyor chains. Accordingly, such chain links often broke under severe stress and uneven loading, were expensive to manufacture, and also had a tendency to wear heavily especially at the areas joined to the other links by chain pins or fasteners. Further, it was very difficult to plate such connecting links with non-corrosive metal to prevent corrosion as is required for use of such chain in food handling industries and other sanitary conditions.

Therefore, a need existed for an improved enclosed track-type conveyor chain and especially for a connecting link for use in such chain which would overcome the above problems and yet provide the necessary amount of articulation. A related but distinct chain link assembly and chain are disclosed in commonly assigned United States patent application Ser. No. 80,656, invented by Gerald W. Gurney and William Lanham, filed on even date herewith.

SUMMARY OF THE INVENTION

Accordingly, the present invention provides a chain link assembly for use in conveyors, and especially in enclosed track-type conveyors, which allows articulation in at least two dimensions, is strong in both tension and compression, is wear resistant, and can be easily and inexpensively manufactured. In addition, the parts of the chain link assembly of the present invention can be easily plated making the assembly highly adaptable for use in sanitary food handling environments.

In one form, the chain link assembly of the present invention includes first and second aligned link members, each link member being elogated and including opposed ends. Each end has an opening for receiving fastening means for attaching the assembly in a chain. The assembly also includes rigid, bridge means extending between the link members at at least two positions intermediate the opposed ends and the chain pin openings of the link members for spacing and supporting the link members when the link members are fitted together to form the assembly.

Preferably, the bridge means include a pair of spaced, rigid bridge members formed integrally with and extending from one link member. Alternately, the link members are identical with one bridge member being on each of the link members. The bridge means preferably include means for receiving chain support wheel supports. The bridge members may also include indexing means for locating and aligning the link members with respect to one another and to maintain the openings in the link members in alignment. Further, the opposed ends of the link members may include curved surfaces which, together with elongated chain pin receiving openings, facilitate articulation of the link assembly when attached in a chain.

In another form of the invention, the chain link assembly of the present invention is included in a conveyor chain. The chain includes the link assembly, at least one second chain link means for connection to the openings at one end of the first chain link assembly to form a chain and fastening means extending through the openings at the said one end of the first chain link assembly and a portion of the second chain link means for attaching the assembly together and allowing articulation between the various link parts. The conveyor chain also includes first wheel means rotatable in at least one plane on the first chain link assembly for supporting the chain when mounted in an enclosed-type conveyor track and second wheel means rotatable in a second plane perpendicular to the first plane for supporting the chain when mounted in an enclosed conveyor track.

The link assembly and chain of the present invention provides increased rigidity as a connecting link of a chain of the type used in an enclosed-type track conveyor. When formed from stamped sheet metal, the link assembly may be hardened for excellent wear resistance while still including a soft metal core for high strength, especially in tension. The indexing means on the bridge members maintain axial alignment of the fastener holes while the curved opposing ends of the link assembly allow articulation in combination with other link structures in the chain. Further, the bridge members support an axle for attaching the chain support wheels which is secured in a fixed position and does not act as a pivot pin thereby increasing the length of the life of the wheel support shaft. Finally, the chain when stamped from sheet metal, can be formed very accurately so that the pitch of the chain is more precise while also allowing quicker and faster formation of the various portions such as the pin receiving holes. Further, such chain can be easily plated to prevent corrosion. As such, the chain link assembly is stronger, longer wearing, less expensive and better suited to various environments including sanitary food handling environments.

These and other objects, advantages, purposes and features of the invention will become more apparent from a study of the following description taken in conjunction with the drawings.

BRIEF DESCRIPTION OF THE DRAWINGS

FIG. 1 is a side elevation of one link member of a first embodiment of the chain link assembly of the present invention;

FIG. 2 is a bottom plan view of the link member shown in FIG. 1;

FIG. 3 is a side elevation of a cooperating link member used in conjunction with the link member shown in FIGS. 1 and 2 in the first chain link assembly;

FIG. 4 is a bottom plan view of the link member shown in FIG. 3;

FIG. 5 is a perspective view of the chain link assembly formed from the link members of FIGS. 1-4;

FIG. 6 is a sectional end view of the chain link assembly of FIG. 5 taken along plane VI—VI of FIG. 5;

FIG. 7 is a side elevation of the chain link assembly of FIGS. 5 and 6 when secured in an enclosed track-type conveyor chain;

FIG. 8 is a side elevation of one link member of a second embodiment of the chain link assembly of the present invention;

FIG. 9 is a bottom plan view of the link member shown in FIG. 8;

FIG. 10 is an end view of the link member shown in FIGS. 8 and 9;

FIG. 11 is a perspective view of the second chain link assembly utilizing two of the identical link members shown in FIGS. 8-10;

FIG. 12 is a plan view of an enclosed track-type conveyor chain assembly within an enclosed track and incorporating the chain link assembly shown in FIG. 11;

FIG. 13 is a side elevation of the enclosed track-type conveyor chain shown in FIG. 12; and FIG. 14 is an end view of the chain shown in FIGS. 12 and 13 taken along plane XIV—XIV of FIG. 12.

DESCRIPTION OF THE PREFERRED EMBODIMENTS

Referring now to the drawings in greater detail, FIGS. 1-7 illustrate a first embodiment 10 of a chain link assembly of the present invention. Link assembly 10, as well as the other link assemblies described below, are especially useful in enclosed track-type conveyor environments such as that shown in FIGS. 7 and 12-14. Although not used to indicate a track which is closed completely around a chain, the term enclosed track is used as it is in the conveyor industry to indicate a conveyor track which has wall surfaces or support surfaces on at least three sides of a chain. A typical enclosed track T having side and bottom walls and an elongated slot or opening in the top wall is best seen in FIG. 14.

Link assembly 10 includes a pair of link members 12 and 14 each of which is elongated and preferably stamped from sheet metal in one piece in a stamping press. Link member 12 includes a planar, intermediate body portion 16 and opposing, curved ends 18, 20. The opposed ends include central chain pin or fastener receiving openings 22, 24 which are adapted to be aligned and registered with similar openings in the opposing link member 14 to receive elongated chain pivot pins such as those shown at 11 in FIG. 7 for attachment of the link assembly to other links in a larger chain of the enclosed track-type or other variety. Ends 18, 20 are also stamped and contoured to include curved cylindrical surfaces in which the openings 22, 24 are located to allow articulation of the chain link assembly with respect to other links in the chain when assembled as mentioned above. The generally cylindrical surfaces are positioned with the axes of the cylinders extending transverse to the direction of elongation of the link. The outermost surfaces of the curved surfaces are flush with body portion 16. Openings 22, 24 are elongated in the direction of elongation of the link. The combination of such elongated openings and the curved cylindrical surfaces on ends 18, 20 allow the chain to move in the plane of the axis of the pin 11 adapted to be received through the openings 22, 24.

The intermediate body portion of link 12 narrows to a waist having parallel edges as is best seen in FIG. 2. Extending integrally and in one piece from the parallel edges of the body 16 are a pair of spaced, parallel, rigid bridge members 26, 28 each having a rectangular shape and extending equidistantly one from and perpendicular to either edge of the body 16. The bottom edges 27, 29 of bridge members 26, 28 are rectilinear, parallel, lie in the same plane and include projecting alignment or indexing tabs 26a which are also rectangular. Bridge members 26, 28 which are parallel to the direction of elongation of the link member include aligned circular openings 30, 31 adapted to receive therein a shaft for supporting the inner race of a chain wheel bearing structure of the type shown in FIGS. 12-14. Openings 30, 31 are sized to receive such a shaft when press fitted to prevent rotation of the shaft and provide longer life therefore.

Opposing link member 14 includes a planar, continuous body portion 32 which is slightly narrower than the opposed ends 34, 36 which include elongated openings 38, 40. Indexing tab receiving recesses 35, 37 are provided in the middle of the respective side edges of body 32. Recesses 35, 37 have a width and length sufficient to receive tabs 26a, and 28a respectively. Opposing ends 34, 36 are stamped to include generally cylindrical, convex, outwardly curved surfaces which include openings 38, 40 and provide articulation in the plane of the chain pins 11 such as those shown in FIG. 7. The width of body portion 32, which includes parallel edges, is the same as the width between the outside surfaces of bridge members 26, 28 denoted by the dimension A in FIG. 2.

FIG. 5 illustrates the assembly of the link members 12 and 14. Although not permanently secured together, link members 12 and 14 are rigidly supported and spaced with respect to one another by the bottom surfaces 27, 29 of bridge members 26, 28 which extend between the edges of the opposing link members to provide secure space support. The bridge members and body portions of the opposing link members provide a box-like mid-section for the link assembly which strengthens and rigidifies the assembly. The length of bottom edges 27, 29 is sufficient to prevent link members from tipping with respect to one another. Tabs 26a, 28a on the bridge members are received in recesses 35, 37 to maintain chain pin receiving openings 22, 38 and 24, 40 in alignment and registry with one another.

When assembled in a chain as in FIG. 7, chain pins or fasteners 11, which are cylindrical and rectilinear, extend through aligned openings in the ends of other link members L and through the aligned openings 22, 38 and 24, 40. Heads 13 and cotter keys or other removable fasteners 15 on the chain pin ends retain link members L against the curved outside surfaces of the opposing ends of the link members 12, 14 with a slight amount of clearance. Even though the openings in link members L are not oversized, and even though the heads 13 include flats abutting raised projections P on the link members to prevent skewing of the pins in link members L, articulation of the chain in the plane of the pin axes is still allowed because each end of the link assembly 10 may pivot by means of the elongated openings 22, 24, 38, 40 and the curved surfaces on the opposing ends. Simultaneously, the bridge members 26, 28 maintain the spacing of the link members 12, 14 and prevent collapse of the members maintaining them in contact with the inside surfaces of link members L.

Another embodiment 50 of the link assembly of the present invention is shown in FIGS. 8–11. Link assembly 50 utilizes two identical link members 52 which engage, mate and register with one another to form the link assembly. Each link member 52 includes a generally planar body portion 54 extending between curved opposing ends 56, 58. Ends 56, 58 include elongated chain pin fastener receiving openings 60, 62 respectively. The opposed ends 56, 58 include generally cylindrical, convex, outwardly facing surfaces extending transverse to the direction of elongation of the link member just as in link members 12, 14.

One edge of the body portion 54 tapers inwardly to a central location at which a rigid flange or bridge member 64 is bent outwardly perpendicular to the plane of body portion 54 and is generally rectangular in configuration. Bridge member 64 includes a circular opening 66 adapted to receive a reduced diameter portion of a chain wheel support shaft telescoped therethrough when assembled with another like link member 52. As shown in FIG. 14, the support shaft S includes a larger diameter central portion providing shoulders engaging the inner surfaces of bridge members 64 to space them apart. The bridge member also includes an outwardly projecting indexing tab 68 projecting from the planar bottom edge 70 of the bridge member. Tab 68 is adapted to be received within a correspondingly shaped recess 72 formed in the opposite edge of body portion 54 of another of the chain links 52. The height of tab 68 corresponds to the thickness of body portion 54. Tabs 68 index and locate the link members 52 longitudinally of one another and maintain openings 60, 62 and 66 in registry and alignment with one another while bridge members 64 space the body portions of the link members apart.

Link assembly 50 is used in identical fashion to link assembly 10 as shown in FIGS. 7 and 12–14 with the additional advantages that only a single type of link member 52 need be made while creating a rigid assembly with links 52 locked together. The link assembly is fashioned from a pair of such identical members assembled as shown in FIG. 11 prior to assembly with chain pins 11 and other link members L as shown in FIGS. 7 and 12–14. During assembly of assembly 50, a shaft S such as that shown in FIG. 14 is inserted through openings 66 and is prevented from escaping by its larger diameter central portion as described above.

Referring to FIGS. 12–14, an enclosed track-type conveyor chain 80 utilizing link assemblies 50 as connecting links between longer work piece supporting links is shown. Enclosed track-type conveyor chain 80 includes a plurality of pairs of elongated work piece support links L which are preferably stamped from sheet metal and include a circular opening in their opposed ends. These openings are aligned with like openings in a like link member L as shown in FIGS. 12 and 13. Link members L also include central circular openings which receive a vertically upwardly extending carriage bolt 82 forming a shaft supporting a horizontally rotatable bearing wheel unit 84 between link members L. Wheel 84 is adapted to engage the side surfaces of the enclosed conveyor track to keep the chain from binding against the sides of the track and spaced therefrom. Secured atop the carriage bolt 82 is a work support assembly 86 adapted to project through the slot or opening between the opposed enclosed track edges in the top wall of the track as shown in FIGS. 13 and 14.

Link assemblies 50 are pivotally attached to the opposite ends of longer links formed from aligned link members L by means of chain pins 11 (FIG. 13). The assembly of link assemblies 50, including link members 52, with link members L is the same as that described in connection with FIGS. 7 and 11. The upwardly bent projections P adjacent the pin receiving openings in link members L (FIGS. 12 and 13) are adapted to have edge surfaces engaging flats on the heads 13 of the chain pins to prevent the pins from rotating and also to resist skewing of the pins or allowing the link members L to shift with respect to one another.

Extending through the aligned openings 66 in bridge members 64 of link members 52 are chain wheel support shafts S (FIGS. 13 and 14). The ends of the shafts are pressed into the inner races of wheel bearing units 88 which provide the principal support for the chain assembly 80. When the wheels are press fitted on the shaft ends the assembly becomes permanent. This form of the invention also allows assembly of the shaft with one link member 52 and one wheel 88 at a time, followed by assembly of another link member and wheel. Chain support wheels 88 associated with each of the link assemblies 50 are adapted to rotate in vertical planes and perpendicular to the plane of rotation of wheel 84.

As will now be understood, the curved surfaces and elongated openings in chain link assemblies 50 allow vertical articulation of the link assemblies 50 with respect to link members L at vertical curves in the track T. Such articulation is generally in the plane of the axes of chain pins 11. Horizontal articulation or pivoting around chain pins 11 transverse to the extension of their axes is provided by the openings in link members 52. The articulation is sufficient to accommodate the typical vertical and horizontal curves in an enclosed track conveyor system while the wheels 88 support the chain vertically within the track T and wheels 84 support the chain laterally within the track prevent it from binding when negotiating such curves.

Link assemblies 10 or 50, when stamped from sheet metal having a thickness of approximately 0.125 inches and formed from sheet C-1010 steel, have been found to have excellent tension resistance in such enclosed track environments. In addition, the stamped links are preferably case hardened after stamping. This provides a softer inner core for high strength in tension and a hardened outer core providing wear resistance expecially at the openings in the link member ends which engage the bodies of the chain pins 11 during articulation around horizontal and vertical curves. Typically, chain pins 11 will have a diameter of 0.375 inches while openings in the chain link members will have a width of 0.378 inches and an elongated length of 0.505 inches. The radius of curvature of the cylindrical surfaces at the ends of the link members is typically 0.625 inches while link members 12, 14 and 52 are typically approximately 3.80 inches long.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A chain link assembly comprising first and second aligned, rigid link members, each link member being elongated and including opposed ends, each end having an opening for receiving fastening means for attaching said assembly in a chain, and rigid bridge means extending between said link members at at least two spaced positions intermediate said opposed ends and said openings of said link members for spacing and supporting said link members when said link members are fitted together to form said assembly; said bridge means including support means for supporting a chain support wheel support.

2. The chain link assembly of claim 1 wherein said bridge means include a pair of spaced, rigid, bridge members extending between said link members.

3. The chain link assembly of claim 2 wherein said bridge members are parallel flanges extending equidistantly in one direction from one of said link members.

4. The chain link assembly of claim 2 wherein said bridge members are parallel flanges extending equidistantly; said link members being identical; one link member including one of said bridge members extending toward said other link member, and the other link member including the other of said bridge members extending toward said one link member.

5. The chain link assembly of claim 2, 3 or 4 wherein a portion of each of said link members intermediate said opposed ends is generally planar; said bridge members each being generally planar and extending perpendicularly between said planar portions of said link members.

6. The chain link assembly of claim 5 wherein said bridge members are parallel to the direction of elongation of said link members and extend between aligned, opposing edges of said link members.

7. The chain link assembly of claim 2 or 4 wherein said bridge members each include an indexing tab projecting therefrom; said link members each including a recess for receiving one of said indexing tabs for locating and aligning said link members with one another and with respect to said bridge members.

8. The chain link assembly of claim 2 wherein said bridge members are parallel to the direction of elongation of said link members and extend between aligned, opposing edges of said link members.

9. The chain link assembly of claim 1 wherein said link members are aligned with said openings in said ends being axially aligned at either end of said assembly, the axes of alignment of said openings at either end being parallel to one another; said support means including at least one opening extending through said bridge means generally transverse to the axes of alignment of said link member openings for receiving a shaft therethrough.

10. The chain link assembly of claim 1 wherein said bridge means include indexing means for locating and aligning said link members with one another and with respect to said bridge means.

11. The chain link assembly of claim 1 wherein said opposing ends of said link members each include a curved surface facing outwardly of said assembly for articulation of said assembly at each end when connected to another member to form a chain, said curved surface including said opening at each end.

12. The chain link assembly of claim 11 wherein said curved surfaces are each cylindrical surfaces, the axes of said cylindrical surfaces extending generally transverse to the direction of elongation of said link members.

13. The chain link assembly of claim 1, 11 or 12 wherein said openings in each of said opposed ends of said link members are elongated in a direction generally parallel to the direction of elongation of said link members.

14. A chain link assembly comprising first and second identical link members, each link member having a longitudinal portion and a transverse bridge portion, said longitudinal portion having first and second opposed ends with an opening in each end for receiving fastener means for attaching said assembly in a chain, said bridge portion being intermediate said openings and adapted to engage, support and index each opposite longitudinal portion such that when said link members are fitted together and receive fastener means, said link members form a chain link assembly with spaced, longitudinally extending sides supported through said bridge portions; said bridge portions being spaced apart in said chain link assembly and including support means for supporting a chain support wheel support.

15. A chain link assembly comprising first and second identical link members, each link member having a longitudinal portion and a transverse bridge portion, said longitudinal portion having first and second opposed ends with an opening in each end for receiving fastener means for attaching said assembly in a chain, said bridge portion being intermediate said openings and adapted to engage, support and index each opposite longitudinal portion such that when said link members are fitted together and receive fastener means, said link members form a chain link assembly with spaced, longitudinally extending sides supported through said bridge portions; said bridge portions being spaced apart in said chain link assembly and including indexing means for locating and aligning said link members with one another and with respect to said bridge portions; said longitudinal portions including recess means for receiving said indexing means.

16. The chain link assembly of claim 15 wherein said indexing means include an indexing tab projecting from each of said bridge portions; said recess means including a recess in each of said link members for receiving one of said indexing tabs for locating and aligning said link members with one another and with respect to said bridge portions.

17. The chain link assembly of claim 15 wherein said link members are aligned with said openings in said ends being axially aligned at either end of said assembly, the axes of alignment of said openings at either end being parallel to one another; said bridge portions each including at least one opening extending therethrough generally transverse to the axes of alignment of said link member openings for receiving a shaft therethrough.

18. The chain link assembly of claim 17 wherein said opposing ends of said link members each include a curved surface facing outwardly of said assembly for articulation of said assembly at each end when connected to another member to form a chain, said curved surface including said opening at each end.

19. The chain link assembly of claim 18 wherein said openings in each of said opposed ends of said link members are elongated in a direction generally parallel to the direction of elongation of said link members.

20. A conveyor chain for enclosed-type conveyor track comprising:
   a first chain link assembly including first and second aligned, rigid link members, each link member being elongated and including opposed ends, each end having an opening for receiving fastening means for attaching said assembly in a chain; and rigid bridge means extending between said link members at at least two spaced positions intermediate said opposed ends and said openings of said link members for spacing and supporting said link members when said link members are fitted together to form said assembly and receive said fastening means, said bridge means including support means for supporting chain support wheel means;
   at least one second chain link means for connection to said openings at one end of said first chain link assembly to form a chain;
   fastening means extending through said openings at said one end of said first chain link assembly and a portion of said second chain link means for attaching said assembly to said second chain link means and allowing articulation between said assembly and second chain link means;
   first wheel means supported by said support means on said bridge means of said first chain link assembly and rotatable in one plane for supporting said chain in one direction when mounted in an enclosed-type conveyor track; and
   second wheel means rotatable in a second plane which is perpendicular to said one plane on said second chain link means for supporting said chain in a direction perpendicular to said one direction when mounted in an enclosed-type conveyor track.

21. The conveyor chain of claim 20 wherein said bridge means include at least one opening extending generally transverse to said openings in said first and second link members at each of said two positions of said bridge means; said first wheel means including a shaft for supporting a wheel received in said openings in said bridge means.

22. The conveyor chain of claim 21 wherein said bridge means include indexing means for locating and aligning said link members with one another and with respect to said bridge means.

23. The conveyor chain of claim 20 or 22 wherein said openings in each of said opposed ends of said link members are elongated in a direction generally parallel to the direction of elongation of said link members.

24. The conveyor chain of claim 23 wherein said opposing ends of said link members each include a curved surface facing outwardly of said assembly, said curved surfaces including said openings at each end of said link member, said curved surfaces, elongated openings, and fastening means allowing articulation of said first chain link assembly with respect to said second chain link means in at least two directions.

25. The conveyor chain of claim 20 wherein said bridge means include a pair of spaced, rigid, parallel bridge members extending equidistantly in one direction from one of said first and second link members.

26. The conveyor chain of claim 20 wherein said bridge means include a pair of spaced, rigid, parallel bridge members; said link members being identical; one link member including one of said bridge members extending toward said other link member, and the other link member including the other of said bridge members extending toward said one link member.

27. The conveyor chain of claim 20 wherein said second chain link means includes third and fourth elongated, aligned link members, each of said third and fourth link members including opposed ends having an opening for receiving said fastening means, said openings in said opposed ends of said third and fourth link members being axially aligned with one another and with the openings at one end of said first chain link assembly, said third and fourth link members being outside said curved surfaces on said one end of said first chain link assembly; said fastening means extending through said aligned openings in said first chain link assembly and said second chain link means for attaching one link assembly to the other and allowing articulation between said assemblies.

28. The conveyor chain of claim 27 wherein said fastening means includes a generally cylindrical chain pin and means at either end of said pin for retaining said first, second, third and fourth link members therebetween.

* * * * *